(12) United States Patent
Hsieh et al.

(10) Patent No.: US 8,653,781 B2
(45) Date of Patent: Feb. 18, 2014

(54) VARIABLE FREQUENCY DRIVE AND ROTATION SPEED SEARCHING APPARATUS FOR AN INDUCTION MOTOR

(75) Inventors: Hui-Chung Hsieh, Danshui (TW); Chi-Lung Hsiao, Xinzhuang (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 127 days.

(21) Appl. No.: 13/239,096

(22) Filed: Sep. 21, 2011

(65) Prior Publication Data
US 2012/0242273 A1     Sep. 27, 2012

(30) Foreign Application Priority Data

Mar. 25, 2011   (CN) .......................... 2011 1 0077358

(51) Int. Cl.
*H02P 27/04* (2006.01)
(52) U.S. Cl.
USPC ........... 318/801; 318/805; 318/810; 318/798; 318/52; 318/432; 363/41; 363/132; 363/58; 363/37; 363/98
(58) Field of Classification Search
USPC ......... 318/806, 801, 805, 800, 802, 807, 810, 318/811, 812, 727, 432, 798, 700, 716, 721, 318/722, 723, 724, 52, 400.3; 363/41, 132, 363/58, 98, 37
See application file for complete search history.

(56) References Cited

U.S. PATENT DOCUMENTS

| | | | |
|---|---|---|---|
| 5,032,771 A * | 7/1991 | Kerkman et al. | 318/52 |
| 5,436,819 A * | 7/1995 | Mikami et al. | 363/41 |
| 6,229,278 B1 * | 5/2001 | Garces et al. | 318/801 |
| 6,472,843 B2 * | 10/2002 | Smith et al. | 318/727 |
| 2003/0057912 A1* | 3/2003 | Iwaji et al. | 318/700 |
| 2008/0157710 A1* | 7/2008 | Tobari et al. | 318/801 |

FOREIGN PATENT DOCUMENTS

JP       2007295648 A   * 11/2007

* cited by examiner

*Primary Examiner* — Eduardo Colon Santana
*Assistant Examiner* — Jorge L Carrasquillo
(74) *Attorney, Agent, or Firm* — Evan R. Witt; Kirton McConkie (57) ABSTRACT

Provided is a variable frequency drive and a rotation speed searching apparatus for an induction motor incorporated therein. The rotation speed searching apparatus is featured by scanning the rotor frequency of the induction motor and determining either the error between a detected DC-bus voltage and a set DC-bus voltage or the error between a detected output current and a set output current, so that the rotation speed of the induction motor can be searched out.

14 Claims, 8 Drawing Sheets

VARIABLE FREQUENCY DRIVE AND ROTATION SPEED SEARCHING APPARATUS FOR AN INDUCTION MOTOR

FIELD OF THE INVENTION

The invention relates to a rotation speed searching apparatus, and more particularly relates to a rotation speed searching apparatus for an induction motor, and a variable frequency drive incorporating such a rotation speed searching apparatus for driving an induction motor.

BACKGROUND OF THE INVENTION

Figure 1:
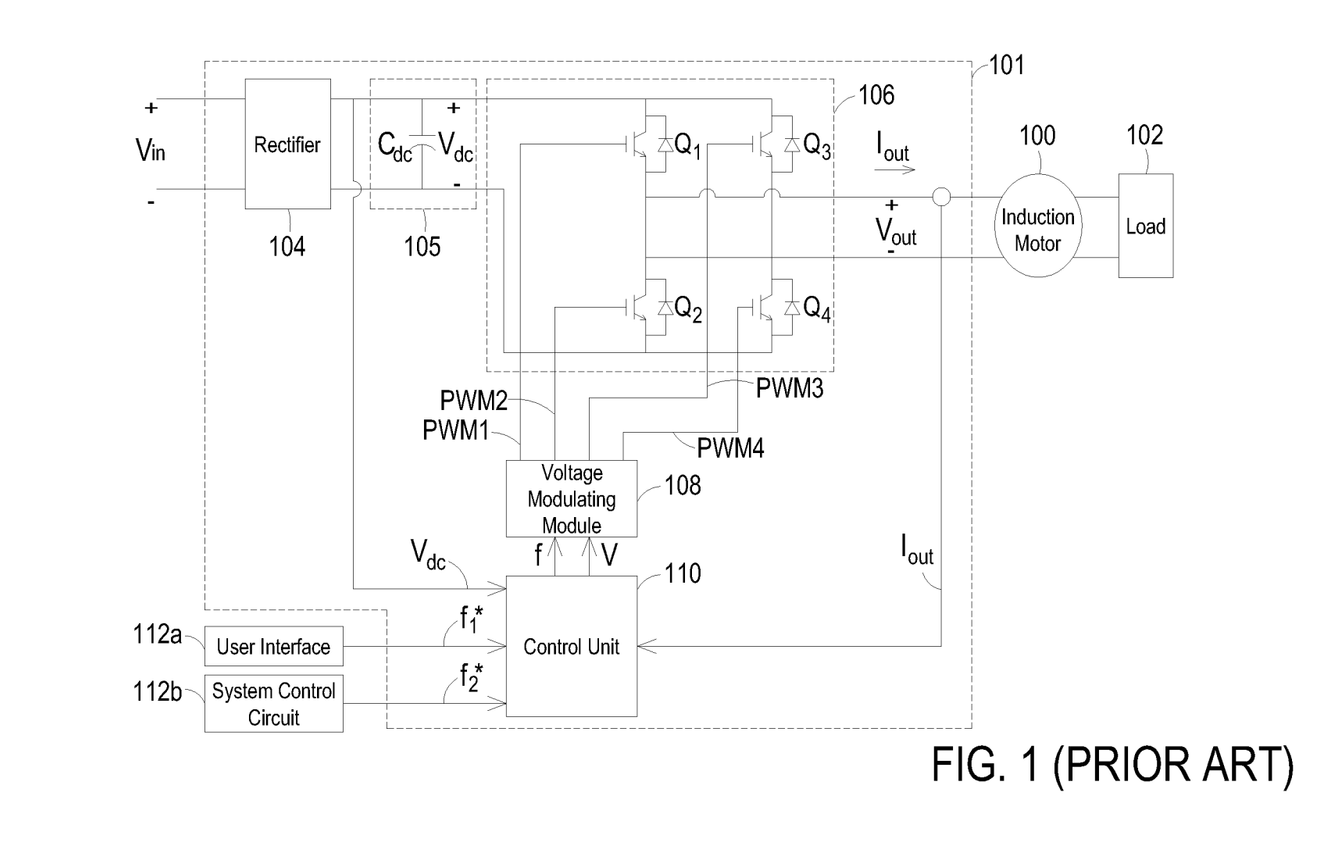
FIG. 1 is a block diagram of an induction motor and the variable frequency drive thereof according to the prior art.

An induction motor has played an important role in industry. Nowadays, an induction motor has been widely employed in many industrial applications, such as a fan or a pump. FIG. 1 shows a block diagram of an induction motor and the variable frequency drive thereof according to the prior art. As shown in FIG. 1, the induction motor 100 is driven by a variable frequency drive 101. An input AC voltage $V_{in}$ is supplied to the input side of a rectifier 104 and is converted into a DC voltage $V_{dc}$ by the rectifier 104. A capacitor $C_{dc}$ 105 is located at the output end of the rectifier 104 for stabilizing the DC voltage $V_{dc}$ and reducing the ripple of the DC voltage $V_{dc}$. The DC voltage $V_{dc}$ is converted into an output AC voltage $V_{out}$ and an AC output current $I_{out}$ by an inverter 106, and the output AC voltage $V_{out}$ and an AC output current $I_{out}$ are supplied to the induction motor 100. The induction motor 100 is driven by the output AC voltage $V_{out}$ and an AC output current $I_{out}$ provided by the inverter 106 to power the load 102. Also, for the sake of controlling the output voltage and output current of the inverter 106, a voltage modulating module 108 is connected to the control terminals of the switching units $Q_1$-$Q_4$ in the inverter 106. The voltage modulating module 108 is configured to receive a voltage signal V and a frequency signal f to generate pulse signals PWM1-PWM4 that are used to control the operation of the switching units $Q_1$-$Q_4$ in the inverter 106. The switching units Q1-Q4 in the inverter 106 are driven to carry out switching according to the pulse signals PWM1-PWM4. A control unit 110 is connected to the voltage modulating module 108 for receiving the DC voltage $V_{dc}$, the output current $I_{out}$ from the inverter 106, a target rotation frequency command signal f*$_1$ given by the user via the user interface 112a, and a rotation frequency command signal f*$_2$ given by the system via the system control circuit 112b. The control unit 110 is able to calculate the voltage signal V and the frequency signal f according to the rotation frequency command signal either f*$_1$ or f*$_2$, the DC-bus voltage $V_{dc}$ and the output current $I_{out}$ for driving the voltage modulating module 108. Thus, the voltage modulating module 108 can control the inverter 106 to output the AC current $I_{out}$ and the AC voltage $V_{out}$.

Generally, rotation speed control for an induction motor 100 is achieved by a variable frequency drive 101. However, when the variable frequency drive 101 starts the induction motor 100, the induction motor 100 may be still rotating freely due to the previous blackout or environment such as water flow, air flow, etc. If the induction motor 100 is driven forcedly under unknown free rotation speed, the induction motor will be easily damaged by frequent over-current condition or energy regeneration.

Currently, two solutions have been presented to tackle the problem that the induction motor is started under unknown free rotation speed. The first solution is called DC braking method. The DC braking method is featured by applying the DC voltage generated by the variable frequency drive 101 to the inductor motor 100, and the rotor of the induction motor 100 can be fixed according to electromagnetism. Nevertheless, the DC braking method has the following disadvantages. First, if the output voltage of the inverter 106 is so small that the magnetic force of the stator of the inductor motor 100 is too weak, the rotor is not easy to be fixed. If the output voltage $V_{out}$ of the inverter 106 is too high, over-current conditions may happen. Second, the output duration of the inverter 106 can not be settled. If the output duration of the inverter 106 is too short, the rotation speed of the induction motor 100 can not be decelerated to fix the rotor. If the output duration of the inverter 106 is too long, the induction motor 100 will be overheated.

The second solution is called mechanical braking method. The mechanical braking method is featured by locking the rotor of the induction motor 100 with an additional latch. Therefore, the rotor shaft is kept stationary before the variable frequency drive 101 outputs the voltage. Nevertheless, the mechanical braking method has the following disadvantages. First, in order to lock the rotor of the induction motor 100, an extra mechanical latch is needed. This would increase the cost of the induction motor 100. Second, as the rotor shaft is susceptible to the load 102, the additional mechanical latch has to bear the stress of the load 102. However, the stress of the load 102 is an unknown variable. If the design of the mechanical latch is defective, the whole system may be damaged.

Therefore, a rotation speed searching apparatus for an induction motor is proposed in order to address the problems encountered by the prior art.

SUMMARY OF THE INVENTION

An object of the invention is to provide a rotation speed searching apparatus for an induction motor, which includes a DC-bus voltage error determining module and an current error determining module for determining if the rotor frequency of the induction motor is larger than or equal to the output frequency of the variable frequency drive, i.e. if the rotor frequency of the induction motor is larger than or equal to the stator frequency of the induction motor. The rotation speed searching apparatus is able to search out the rotation speed of the induction motor by the above-mentioned determination, and it begins controlling the operation of the switching units in the inverter from the searched-out rotation speed, such that the success rate of searching out the rotation speed of the induction motor can be improved.

According to the first aspect of the invention, a rotation speed searching apparatus for an induction motor is provided. The inventive rotation speed searching apparatus includes: (I) a first voltage/frequency controller for receiving a frequency command signal and converting the frequency command signal into a first control signal; (II) a frequency searching module for generating a frequency scanning signal whose voltage is insufficient to affect the rotation speed of the induction motor to scan a rotor frequency of the induction motor and processing the frequency scanning signal to generate a second control signal; (III) a switch having one terminal connected to a voltage modulating module and the other terminal operatively connected to the first voltage/frequency controller or the frequency searching module for passing the first control signal or the second control signal to the voltage modulating module according to its operation; (IV) a DC-bus voltage error determining module connected to a control terminal of the switch for comparing a detected DC-bus voltage with a set DC-bus voltage; and (V) a current error determining module connected to the control terminal of the switch for comparing a feedback current with a set current. When the DC-bus voltage error determining module determines that the detected DC-bus voltage is larger than or equal to the set DC-bus voltage or when the current error determining module determines that the feedback current is smaller than or equal to the set current, the switch is switched to pass the first control signal to the voltage modulating module, such that the voltage modulating module controls an inverter to drive the induction motor according to the first control signal. Otherwise, when the DC-bus voltage error determining module determines that the detected DC-bus voltage is smaller than the set DC-bus voltage and when the current error determining module determines that the feedback current is larger than the set current, the switch is switched to pass the second control signal to the voltage modulating module, such that the voltage modulating module controls the inverter to drive the induction motor according to the second control signal, and then the DC-bus voltage error determining module compares the detected DC-bus voltage with the set DC-bus voltage and the current error determining module compares the feedback current with the set current iteratively.

According to the second aspect of the invention, a variable frequency drive for driving an induction motor is provided. The inventive variable frequency drive for an induction motor includes: (I) a rectifier for converting an input AC power source into a DC power source; (II) a capacitor for filtering, storing energy and holding DC voltage for the DC power source; (III) an inverter having a plurality of switching units for converting the DC power source into an output AC power source; (IV) a voltage modulating module for generating a voltage modulating signal according to a modulation control signal to control the operation of the switching units; (V) a rotation speed searching apparatus for an induction motor comprising: (i) a first voltage/frequency controller for receiving a frequency command signal and converting the frequency command signal into a first control signal; (ii) a frequency searching module for generating a frequency scanning signal to scan a rotor frequency of the induction motor and processing the frequency scanning signal to generate a second control signal; (iii) a switch having one terminal connected to a voltage modulating module and the other terminal operatively connected to the first voltage/frequency controller or the frequency searching module for passing the first control signal or the second control signal as the modulation control signal to the voltage modulating module according to its operation; (iv) a DC-bus voltage error determining module connected to a control terminal of the switch for comparing a detected DC-bus voltage with a set DC-bus voltage; and (v) a current error determining module connected to the control terminal of the switch for comparing a feedback current with a set current, in which the switching units in the inverter are configured to drive the induction motor according to the voltage modulating signal. When the DC-bus voltage error determining module determines that the detected DC-bus voltage is larger than or equal to the set DC-bus voltage or when the current error determining module determines that the feedback current is smaller than or equal to the set current, the switch is switched to pass the first control signal to the voltage modulating module, such that the voltage modulating module controls an inverter to drive the induction motor according to the first control signal. Otherwise, when the DC-bus voltage error determining module determines that the detected DC-bus voltage is smaller than the set DC-bus voltage and when the current error determining module determines that the feedback current is larger than the set current, the switch is switched to pass the second control signal to the voltage modulating module, such that the voltage modulating module controls the inverter to drive the induction motor according to the second control signal, and then the DC-bus voltage error determining module compares the detected DC-bus voltage with the set DC-bus voltage and the current error determining module compares the feedback current with the set current iteratively.

Now the foregoing and other features and advantages of the invention will be best understood through the following descriptions with reference to the accompanying drawings, wherein:

DESCRIPTION OF THE PREFERRED EMBODIMENT

An exemplary embodiment embodying the features and advantages of the invention will be expounded in following paragraphs of descriptions. It is to be realized that the present invention is allowed to have various modification in different respects, all of which are without departing from the scope of the present invention, and the description herein and the drawings are to be taken as illustrative in nature, but not to be taken as a confinement for the invention.

Figure 2:
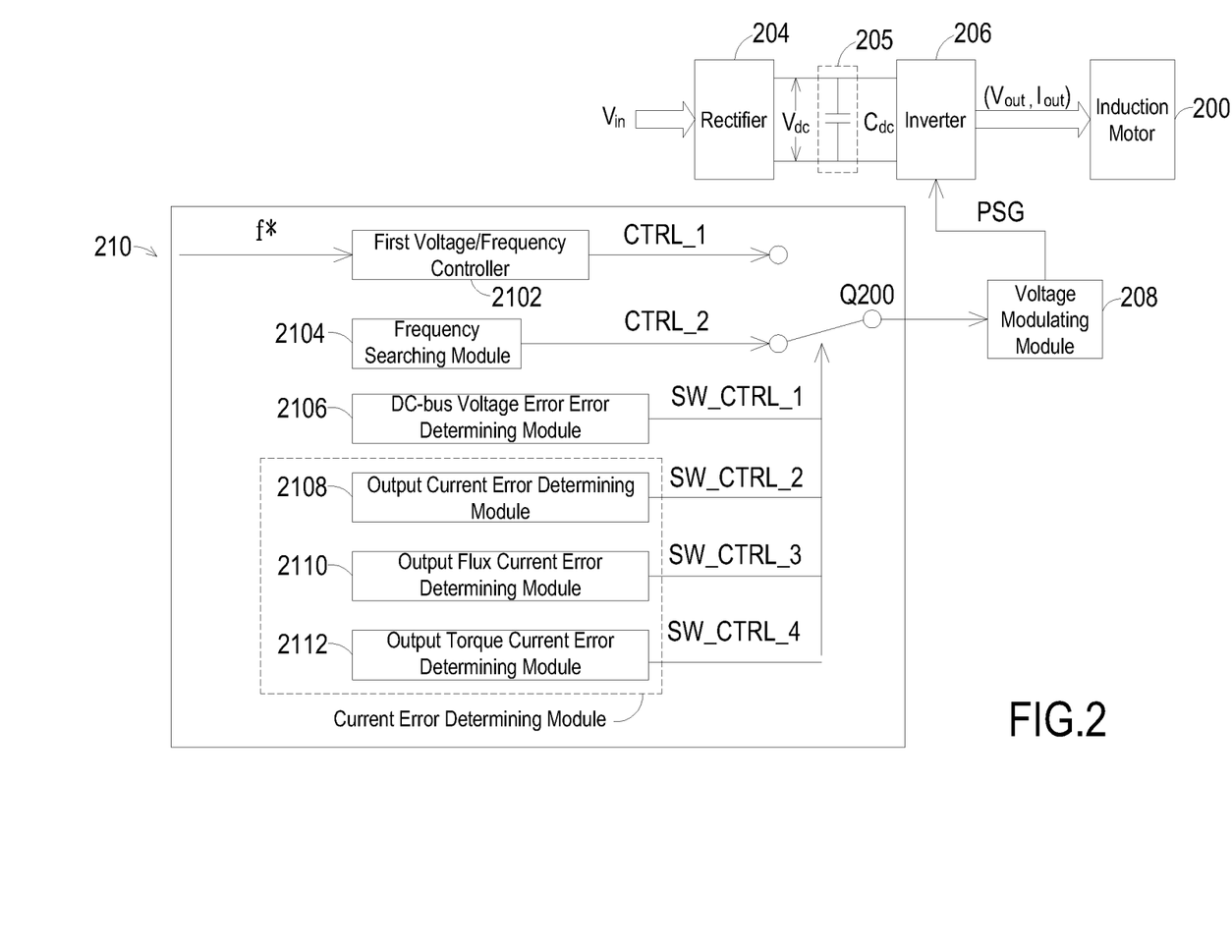
FIG. 2 is a block diagram of a rotation speed searching apparatus for an induction motor according to an exemplary embodiment of the invention.

A block diagram of a rotation speed searching apparatus for an induction motor according to an exemplary embodiment of the invention is shown in FIG. 2. As shown in FIG. 2, an induction motor 200 is powered by an inverter 206. A rectifier 204 is used to receive an input AC voltage $V_{in}$ and to convert the input AC voltage $V_{in}$ into a DC-bus voltage $V_{dc}$. The DC-bus voltage $V_{dc}$ is the voltage drop across a capacitor $C_{dc}$ (205). The inverter 206 is used to convert the DC-bus voltage $V_{dc}$ provided by the rectifier 204 into an output AC voltage $V_O$ for driving the induction motor 200. Also, the operation of the switching units (not shown) in the inverter 206 is controlled by a voltage modulating module 208. The voltage modulating module 208 is connected to the control terminals of the inverter 206 and is configured to control the operation of the switching units in the inverter 206 by a pulse signal PSG. The switching units in the inverter 206 will be implemented by any controllable power semiconductor. Also, a rotation speed searching apparatus 210 is connected to the voltage modulating module 208 for searching the rotation speed of the induction motor 200 and providing a first control signal CTRL_1 or a second control signal CTRL_2 to the voltage modulating module 208, and then the voltage modulating module 208 begins controlling the rotor frequency and the rotation speed of the induction motor 200 from the searched-out rotation speed.

The rotation speed searching apparatus 210 includes a first voltage/frequency controller 2102 for receiving a frequency command signal f* given by the user and converting the frequency command signal f* into the first control signal CTRL_1. The first control signal CTRL_1 denotes the user desired rotor frequency of the induction motor 200. Besides, the rotation speed searching apparatus 210 includes a frequency searching module 2104 for searching out the rotation speed of the induction motor 200 and outputting a second control signal CTRL_2. The second control signal CTRL_2 denotes the scanning rotor frequency of the induction motor 200 for searching the rotation speed of the induction motor 200. The rotation speed searching apparatus 210 also includes a switch Q200 connected among the voltage modulating module 208, the first voltage/frequency controller 2102 and the frequency searching module 2104 for selectively passing the first control signal CTRL_1 or the second control signal CTRL_2 to the voltage modulating module 208. Furthermore, the rotation speed searching apparatus 210 includes a DC-bus voltage error determining module 2106, an output current error determining module 2108, an output flux current error determining module 2110 and an output torque current error determining module 2112 for determining if the frequency searching module 2104 has searched out the rotation speed of the induction motor 200 and respectively sending a switch control signal SW_CTRL_1, SW_CTRL_2, SW_CTRL_3 and SW_CTRL_4 to the switch Q200 when it is determined that the frequency searching module 2104 has searched out the rotation speed of the induction motor 200. Afterwards the voltage modulating module 208 begins controlling the rotation speed of the induction motor 200 from the searched-out rotation speed to the target frequency indicated by the frequency command f*. It should be noted that the switch Q200 passes the second control signal CTRL_2 outputted by the frequency searching module 2104 to the voltage modulating module 208 when the rotation speed searching apparatus 210 searches the rotation speed of the induction motor 200 and the frequency searching module 2104 does not search out the rotation speed of the induction motor 200 yet.

Figure 3:
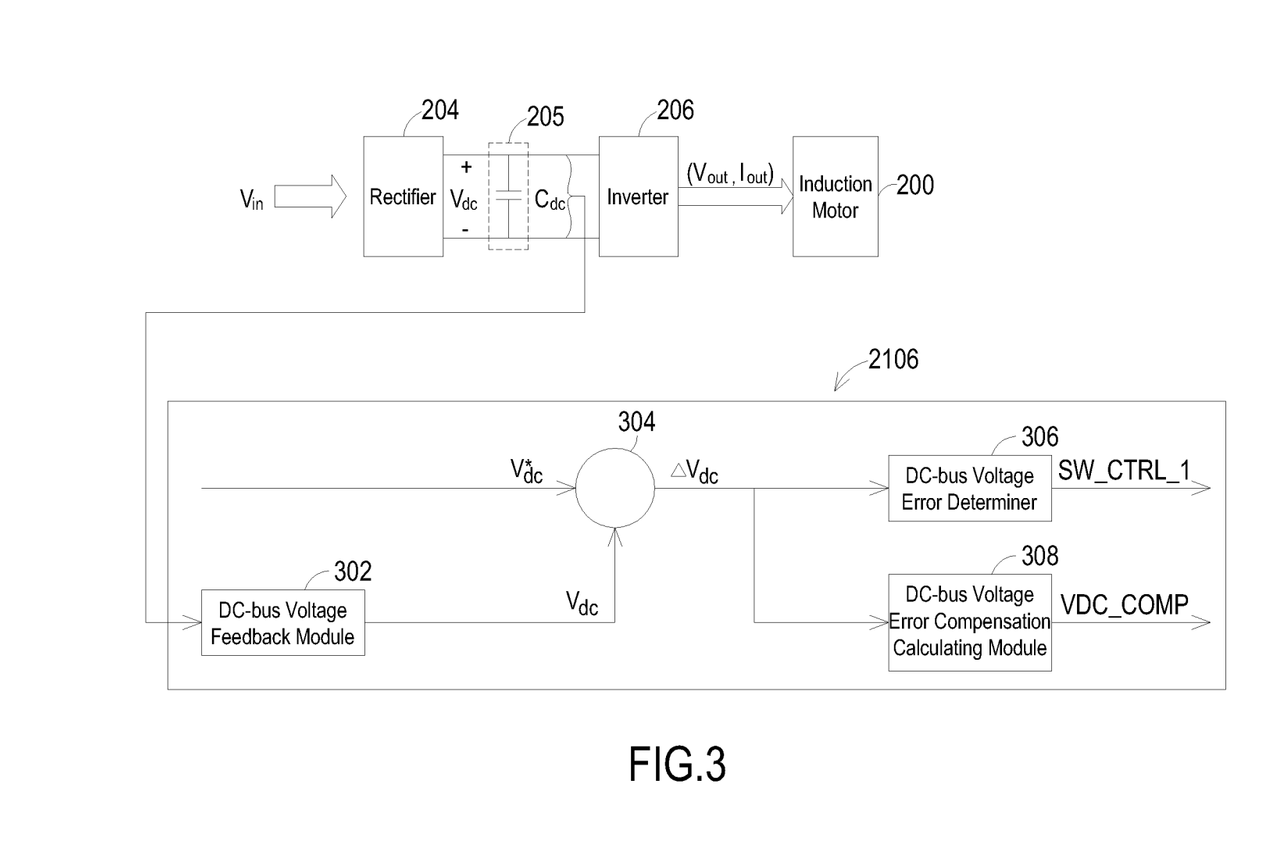
FIG. 3 is a block diagram of the DC-bus voltage error determining module in the rotation speed searching apparatus for an induction motor according to an exemplary embodiment of the invention.

Referring to FIG. 3, a block diagram of the DC-bus voltage error determining module in the rotation speed searching apparatus for an induction motor according to an exemplary embodiment of the invention is illustrated. As shown in FIG. 3, the DC-bus voltage error determining module 2106 includes a DC-bus voltage feedback module 302, a first operator 304, a DC-bus voltage error determiner 306 and a DC-bus voltage error compensation calculating module 308. The DC-bus voltage feedback module 302 is used to detect the DC-bus voltage and generate the detected DC-bus voltage $V_{dc}$. The first operator 304 is connected to the DC-bus voltage feedback module 302 for comparing the detected DC-bus voltage $V_{dc}$ with a set DC-bus voltage $V^*_{dc}$, and then outputting a DC-bus voltage error signal $\Delta V_{dc}$ according to the comparison. The DC-bus voltage error determiner 306 is connected to the first operator 304 for determining if the detected DC-bus voltage $V_{dc}$ is larger than or equal to the set DC-bus voltage $V^*_{dc}$ according to the DC-bus voltage error signal $\Delta V_{dc}$. When the DC-bus voltage error determiner 306 determines that the detected DC-bus voltage $V_{dc}$ is larger than or equal to the set DC-bus voltage $V^*_{dc}$, it indicates that the frequency searching module 2104 has searched out the rotation speed of the induction motor 200. Afterwards the DC-bus voltage error determiner 306 outputs a first switch control signal SW_CTRL_1 to the control terminal of the switch Q200 shown in FIG. 2 to drive the switch Q200 to pass the first control signal CTRL_1.

Therefore, the DC-bus voltage error determining module 2106 can detect the DC-bus voltage by the DC-bus voltage feedback module 302 and can calculate the difference between the detected DC-bus voltage $V_{dc}$ and the set DC-bus voltage $V^*_{dc}$ by the first operator 304. Finally, the DC-bus voltage error determiner 306 determines if the detected DC-bus voltage $V_{dc}$ is larger than or equal to the set DC-bus voltage $V^*_{dc}$, and thereby determines if the rotor frequency of the induction motor 200 relative to the rotation speed of the induction motor 200 has been searched out. If the rotor frequency of the induction motor 200 is larger than the stator frequency of the induction motor 200, the induction motor 200 operates in the generator region and generates negative torque reverse to the rotation direction of the rotor. Under this condition, the DC-bus voltage $V_{dc}$ increases in response to regenerative energy. Therefore, the determination of whether the rotor frequency of the induction motor 200 is larger than or equal to the stator frequency of the induction motor 200 can be attained by calculating the difference between the detected DC-bus voltage $V_{dc}$ and the set DC-bus voltage $V^*_{dc}$ and determining if the detected DC-bus voltage $V_{dc}$ is larger than or equal to the set DC-bus voltage $V^*_{dc}$. If it is determined that the detected DC-bus voltage $V_{dc}$ is larger than or equal to the set DC-bus voltage $V^*_{dc}$, it indicates that the rotor frequency of the induction motor 200 is larger than or equal to the stator frequency of the induction motor 200. That would indicate that the rotor frequency of the induction motor 200 relative to the rotation speed of the induction motor 200 has been searched out. Under this condition, a frequency scanning signal FREQ_SCAN outputted by a frequency scanning module 702 (shown in FIG. 7) in the frequency searching module 2104 is the rotor frequency of the induction motor 200 relative to the rotation speed of the induction motor 200. Hence, the first switch control signal SW_CTRL_1 outputted by the DC-bus voltage error determiner 306 will drive the switch Q200 to be connected to the first voltage/frequency controller 2102 in order to pass the first control signal CTRL_1 to the voltage modulating module 208, and thereby the voltage modulating module 208 sends the pulse signal PSG to the inverter 206 to control the operation of the inverter 206. In this manner, the rotor frequency of the induction motor 200 and the relative rotation speed of the induction motor 200 thereof can be controlled according to the frequency command signal f* while using the searched-out rotor frequency of the induction motor 200 and the relative rotation speed of the induction motor 200 thereof as the starting point for rotation speed control. Also, the DC-bus voltage error compensation calculating module 308 is connected to the first operator 304 for calculating a DC-bus voltage error compensating signal VDC_COMP according to the DC-bus voltage error signal $\Delta V_{dc}$.

Figure 4:
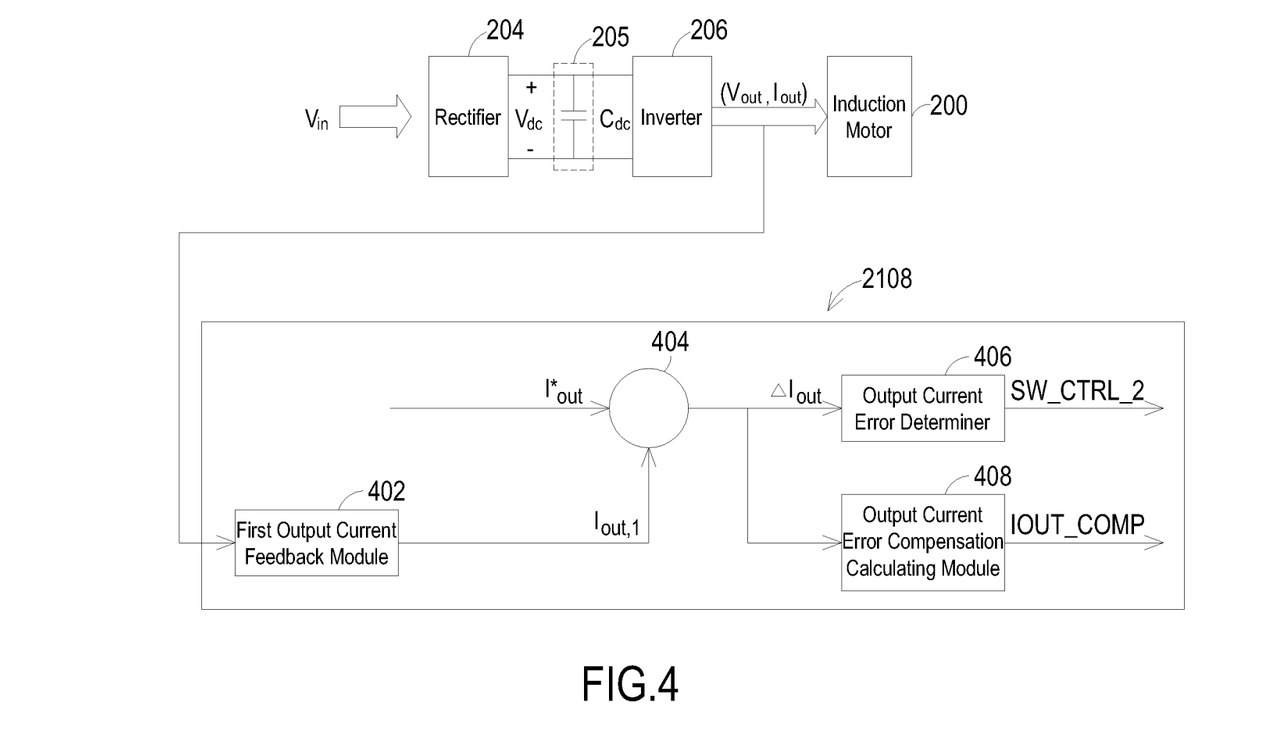
FIG. 4 is a block diagram of the output current error determining module in the rotation speed searching apparatus for an induction motor according to an exemplary embodiment of the invention.

Referring to FIG. 4, a block diagram of the output current error determining module in the rotation speed searching apparatus for an induction motor according to an exemplary embodiment of the invention is illustrated. The output current error determining module 2108 includes a first output current feedback module 402, a second operator 404, an output current error determiner 406 and an output current error compensation calculating module 408. The first output current feedback module 402 is connected to the output end of the inverter 206 for detecting the output current of the inverter 206 to generate a first detected output current $I_{out,1}$. The second operator 404 is connected to the first output current feedback module 402 for comparing the first detected output current $I_{out,1}$ with a set output current $I^*_{out}$, and then outputting an output current error signal $\Delta I_{out}$ according to the comparison. The output current error determiner 406 is connected to the second operator 404 for determining if the first detected output current $I_{out,1}$ is smaller than or equal to the set output current $I^*_{out}$ according to the output current error signal $\Delta I_{out}$. When the output current error determiner 406 determines that the first detected output current $I_{out,1}$ is smaller than or equal to the set output current $I^*_{out}$, a second switch control signal SW_CTRL_2 is outputted to drive the switch Q200 to pass the first control signal CTRL_1. Hence, the output current error determining module 2108 can detect the output current of the inverter 206 by the first output current feedback module 402 and can calculate the difference between the first detected output current $I_{out,1}$ and the set output current $I^*_{out}$ by the second operator 404. Finally, the output current error determiner 406 determines if the first detected output current $I_{out,1}$ is smaller than or equal to the set output current $I^*_{out}$, and thereby determines if the rotor frequency of the induction motor 200 relative to the rotation speed of the induction motor 200 has been searched out. If the rotor frequency of the induction motor 200 is larger than or equal to the stator frequency of the induction motor 200 (i.e. the output frequency of the inverter 206), the induction motor 200 will generate a minimum output current. If the first detected output current $I_{out,1}$ is smaller than or equal to the set output current $I^*_{out}$, it indicates that the rotor frequency of the induction motor 200 relative to the rotation speed of the induction motor 200 has been searched out. Hence, the second switch control signal SW_CTRL_2 outputted by the output current error determiner 406 will drive the switch Q200 to be connected to the first voltage/frequency controller 2102, thereby passing the first control signal CTRL_1 to the voltage modulating module 208. Thus, the voltage modulating module 208 can output the pulse signal PSG to the inverter 206 to control the operation of the inverter 206. In this manner, the rotor frequency of the induction motor 200 and the relative rotation speed of the induction motor 200 thereof can be controlled according to the frequency command signal f* while using the searched-out rotor frequency of the induction motor 200 and the relative rotation speed of the induction motor 200 thereof as the starting point for rotation speed control. Also, the output current error compensation calculating module 408 is connected to the second operator 404 for calculating an output current error compensating signal IOUT_COMP according to the output current error signal $\Delta I_{out}$.

Figure 5:
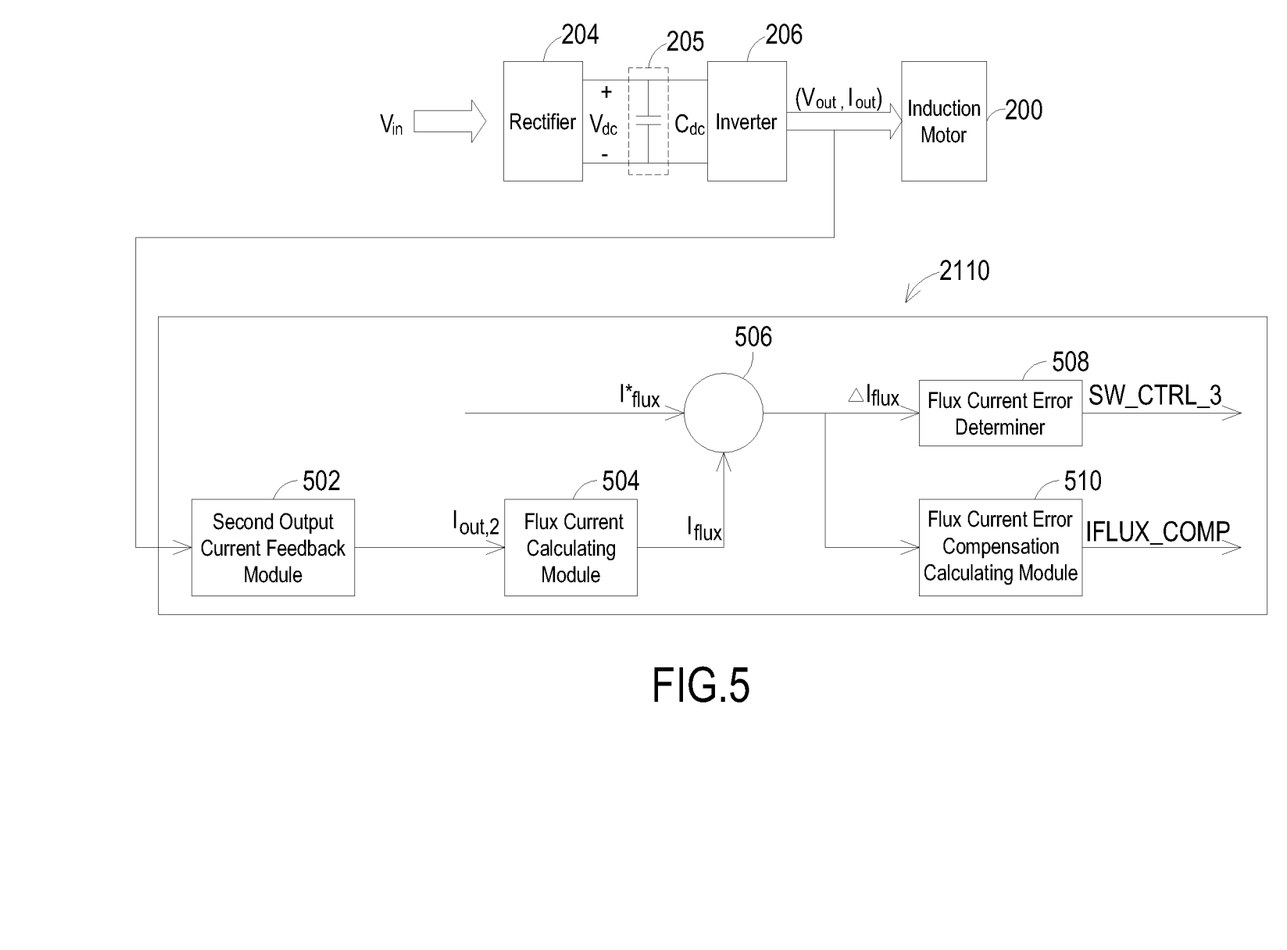
FIG. 5 is a block diagram of the output flux current error determining module in the rotation speed searching apparatus for an induction motor according to an exemplary embodiment of the invention.

Referring to FIG. 5, a block diagram of the output flux current error determining module in the rotation speed searching apparatus for an induction motor according to an exemplary embodiment of the invention is illustrated. The output flux current error determining module 2110 includes a second output current feedback module 502, a flux current calculating module 504, a third operator 506, a flux current error determiner 508 and a flux current error compensation calculating module 510. The second output current feedback module 502 is connected to the output end of the inverter 206 for detecting the output current of the inverter 206 to generate a second detected output current $I_{out,2}$. The flux current calculating module 504 is connected to the output end of the second output current feedback module 502 for calculating the flux current component of the second detected output current $I_{out,2}$, thereby generating an output flux current $I_{flux}$. The third operator 506 is connected to the flux current calculating module 504 for comparing the output flux current $I_{flux}$ with a set flux current $I^*_{flux}$, and then outputting a flux current error signal $\Delta I_{flux}$. The flux current error determiner 508 is connected to the third operator 506 for determining if the output flux current $I_{flux}$ is smaller than or equal to the set flux current $I^*_{flux}$ according to the flux current error signal $\Delta I_{flux}$. When the flux current error determiner 508 determines that the output flux current $I_{flux}$ is smaller than or equal to the set flux current $I^*_{flux}$, a third switch control signal SW_CTRL_3 is outputted to drive the switch Q200 to pass the first control signal CTRL_1. Hence, the output flux current error determining module 2110 can calculate the flux current component of the output current of the inverter 206 by the flux current calculating module 504 and can calculate the difference between the output flux current $I_{flux}$ and the set flux current $I^*_{flux}$ by the third operator 506. Finally, the flux current error determiner 508 determines if the output flux current $I_{flux}$ is smaller than or equal to the set flux current $I^*_{flux}$, and thereby determines if the rotor frequency of the induction motor 200 relative to the rotation speed of the induction motor 200 has been searched out. If the output flux current $I_{flux}$ is smaller than or equal to the set flux current $I^*_{flux}$, it indicates that the rotor frequency of the induction motor 200 relative to the rotation speed of the induction motor 200 has been searched out. Hence, the third switch control signal SW_CTRL_3 outputted by the flux current error determiner 508 will drive the switch Q200 to be connected to the first voltage/frequency controller 2102, thereby passing the first control signal CTRL_1 to the voltage modulating module 208. Thus, the voltage modulating module 208 can output the pulse signal PSG to the inverter 206 to control the operation of the inverter 206. In this manner, the rotor frequency of the induction motor 200 and the relative rotation speed of the induction motor 200 can be controlled according to the frequency command signal f* while using the searched-out rotor frequency of the induction motor 200 and the relative rotation speed of the induction motor 200 thereof as the starting point for rotation speed control. Also, the flux current error compensation calculating module 510 is connected to the third operator 506 for calculating an output flux current error compensating signal IFLUX_COMP according to the flux current error signal $\Delta I_{flux}$.

Figure 6:
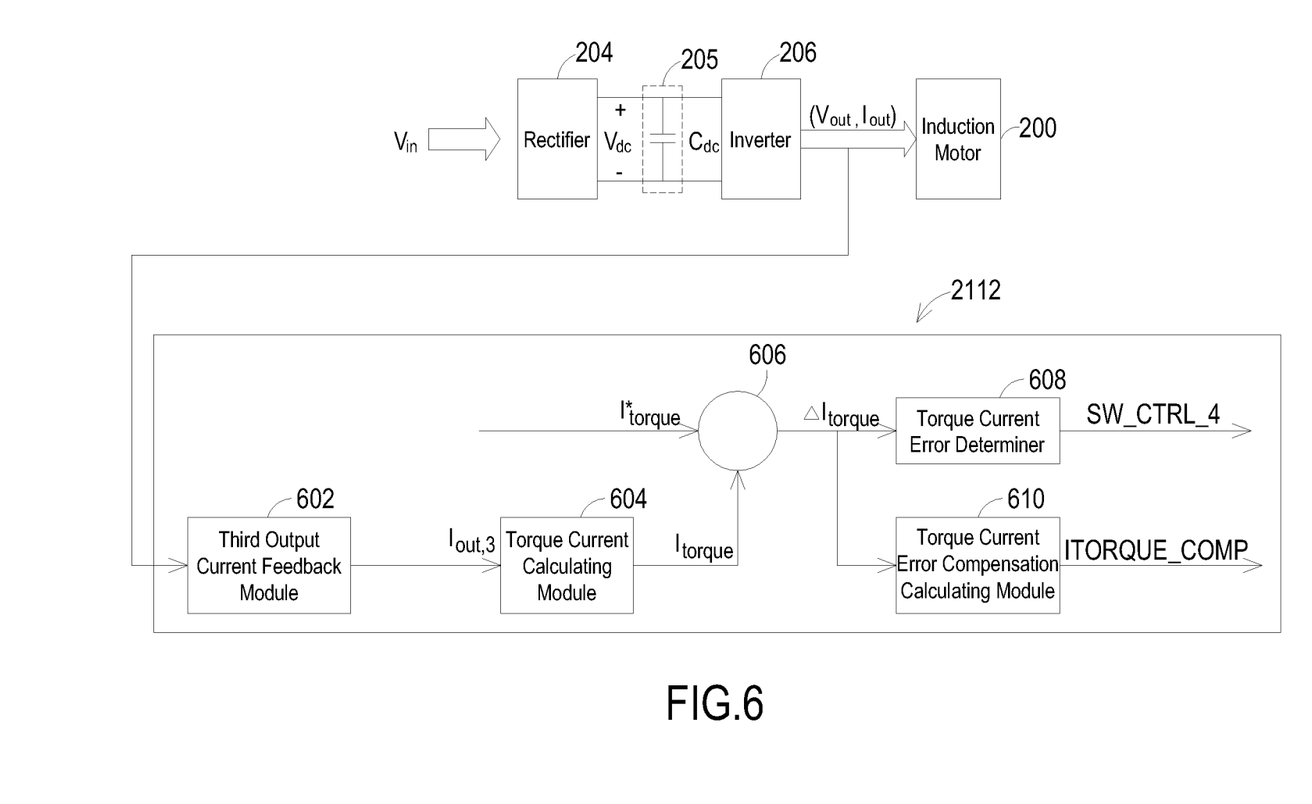
FIG. 6 is a block diagram of the output torque current error determining module in the rotation speed searching apparatus for an induction motor according to an exemplary embodiment of the invention.

Referring to FIG. 6, a block diagram of the output torque current error determining module in the rotation speed searching apparatus for an induction motor according to an exemplary embodiment of the invention is illustrated. The output torque current error determining module 2112 includes a third output current feedback module 602, a torque current calculating module 604, a fourth operator 606, a torque current error determiner 608 and a torque current error compensation calculating module 610. The third output current feedback module 602 is connected to the output end of the inverter 206 for detecting the output current of the inverter 206 to generate a third detected output current $I_{out,3}$. The torque current calculating module 604 is connected to the output end of the third output current feedback module 602 for calculating the torque current component of the third detected output current $I_{out,3}$, thereby generating an output torque current $I_{torque}$. The fourth operator 606 is connected to the torque current calculating module 604 for comparing the output torque current $I_{torque}$ with a set torque current $I^*_{torque}$, and then outputting a torque current error signal $\Delta I_{torque}$. The torque current error determiner 608 is connected to the fourth operator 606 for determining if the output torque current $I_{torque}$ is smaller than or equal to the set torque current $I^*_{torque}$ according to the torque current error signal $\Delta I_{torque}$. When the torque current error determiner 608 determines that the output torque current $I_{torque}$ is smaller than or equal to the set torque current $I^*_{torque}$, a fourth switch control signal SW_CTRL_4 is outputted to drive the switch Q200 to pass the first control signal CTRL_1. Hence, the output torque current error determining module 2112 can calculate the torque current component of the output current of the inverter 206 by the torque current calculating module 604 and can calculate the difference between the output torque current $I_{torque}$ and the set torque current $I^*_{torque}$ by the fourth operator 606. Finally, the torque current error determiner 608 determines if the output torque current $I_{torque}$ is smaller than or equal to the set torque current $I^*_{torque}$, and thereby determines if the rotor frequency of the induction motor 200 relative to the rotation speed of the induction motor 200 has been searched out. If the output torque current $I_{torque}$ is smaller than or equal to the set torque current $I^*_{torque}$, it indicates that the rotor frequency of the induction motor 200 relative to the rotation speed of the induction motor 200 has been searched out. Hence, the fourth switch control signal SW_CTRL_4 outputted by the torque current error determiner 608 will drive the switch Q200 to be connected to the first voltage/frequency controller 2102, thereby passing the first control signal CTRL_1 to the voltage modulating module 208. Thus, the voltage modulating module 208 can output the pulse signal PSG to the inverter 206 to control the operation of the inverter 206. In this manner, the rotor frequency of the induction motor 200 and the relative rotation speed of the induction motor 200 can be controlled according to the frequency command signal f* while using the searched-out rotor frequency of the induction motor 200 and the relative rotation speed of the induction motor 200 thereof as the starting point for rotation speed control. Also, the torque current error compensation calculating module 610 is connected to the fourth operator 606 for calculating an output torque current error compensating signal ITORQUE_COMP according to the torque current error signal $\Delta I_{torque}$.

Figure 7:
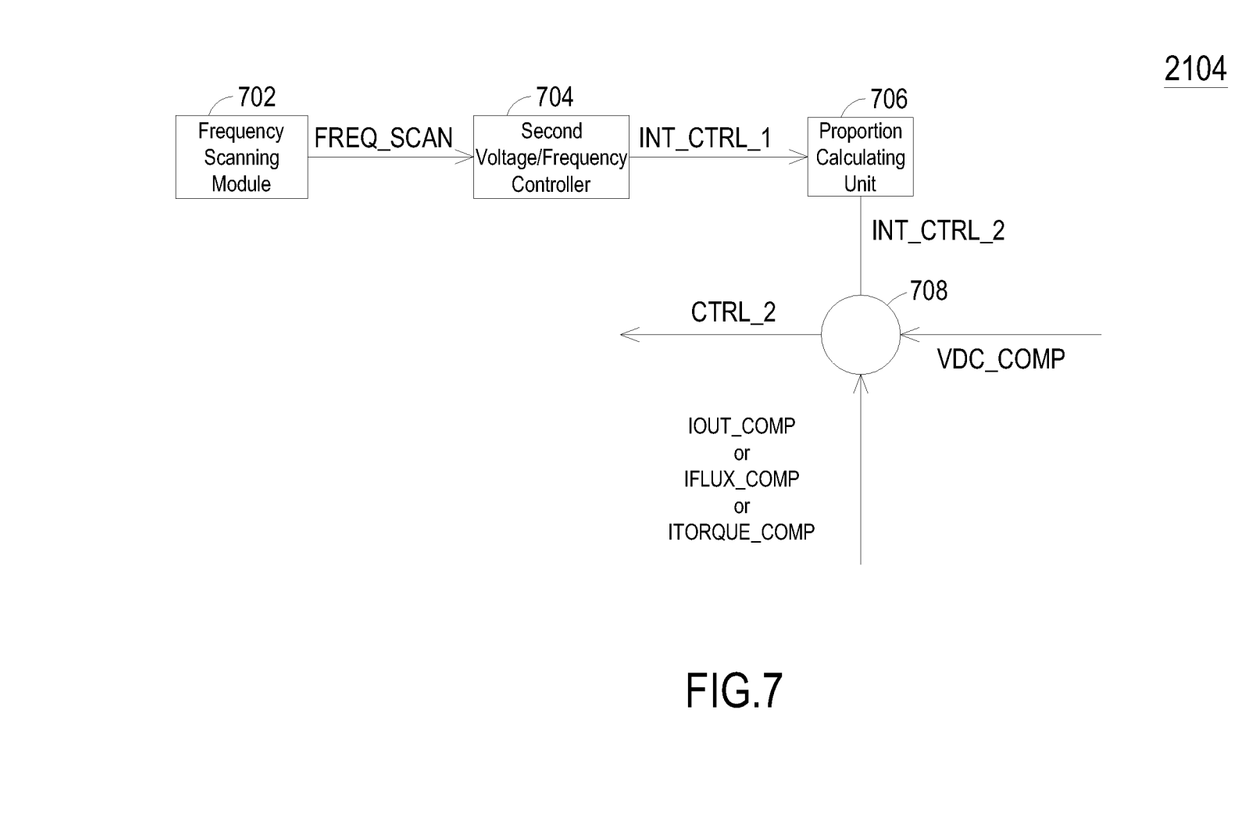
FIG. 7 is a block diagram of the frequency searching module in the rotation speed searching apparatus for an induction motor according to an exemplary embodiment of the invention.

Referring to FIG. 7, a block diagram of the frequency searching module in the rotation speed searching apparatus for an induction motor according to an exemplary embodiment of the invention is shown. The frequency searching module 2104 includes a frequency scanning module 702, a second voltage/frequency controller 704, a proportion calculating unit 706, and an adder 708. The proportion calculating unit 706 can be a single-loop or a multi-loop calculating unit. The frequency scanning module 702 is configured to output a frequency scanning signal FREQ_SCAN from high frequencies to low frequencies in order to search out the rotor frequency of the induction motor 200. The second voltage/frequency controller 704 is connected to the frequency scanning module 702 for converting the frequency scanning signal FREQ_SCAN into a first internal control signal INT_CTRL_1. The proportion calculating unit 706 is connected to the second voltage/frequency controller 704 for generating a second internal control signal INT_CTRL_2 in response to performing proportional calculation to the first internal control signal INT_CTRL_1. The adder 708 is connected to the proportion calculating unit 706 for generating the second control signal CTRL_2 in response to adding up the second internal control signal INT_CTRL_2, the DC-bus voltage error compensating signal VDC_COMP and at least one of the output current error compensating signal IOUT_COMP, the flux current error compensating signal IFLUX_COMP and the torque current error compensating signal ITORQUE_COMP.

Hence, when the detected DC-bus voltage $V_{dc}$ is larger than or equal to the set DC-bus voltage $V^*_{dc}$, or when one of the output current error determining module 2108, the output flux current error determining module 2110 and the output torque current error determining module 2112 determines that the feedback current ($I_{out,1}$, $I_{flux}$ or $I_{torque}$) is smaller than or equal to a set current ($I^*_{out}$, $I^*_{flux}$ or $I^*_{torque}$), i.e. $I_{out,1} \leq I^*_{out}$, $I_{flux} \leq I^*_{flux}$ or $I_{torque} \leq I^*_{torque}$, it indicates that the frequency searching module 2104 has searched out the rotation speed of the induction motor 200. Under this condition, DC-bus voltage error determining module 2106 or at least one of the output current error determining module 2108, the output flux current error determining module 2110 and the output torque current error determining module 2112 will send at least one of the switch control signals (SW_CTRL_1, SW_CTRL_2, SW_CTRL_3 or SW_CTRL_4) to the control terminal of the switch Q200. In this manner, the switch Q200 is driven to pass the first control signal CTRL_1 to the voltage modulating module 208, and then the voltage modulating module 208 and the inverter 206 control the rotor frequency of the induction motor 200 according to the frequency command signal f* from the rotor frequency of the induction motor 200 relative to the searched-out rotation speed of the induction motor 200 as shown in FIG. 2, FIG. 3, FIG. 4, FIG. 5 and FIG. 6.

Figure 8:
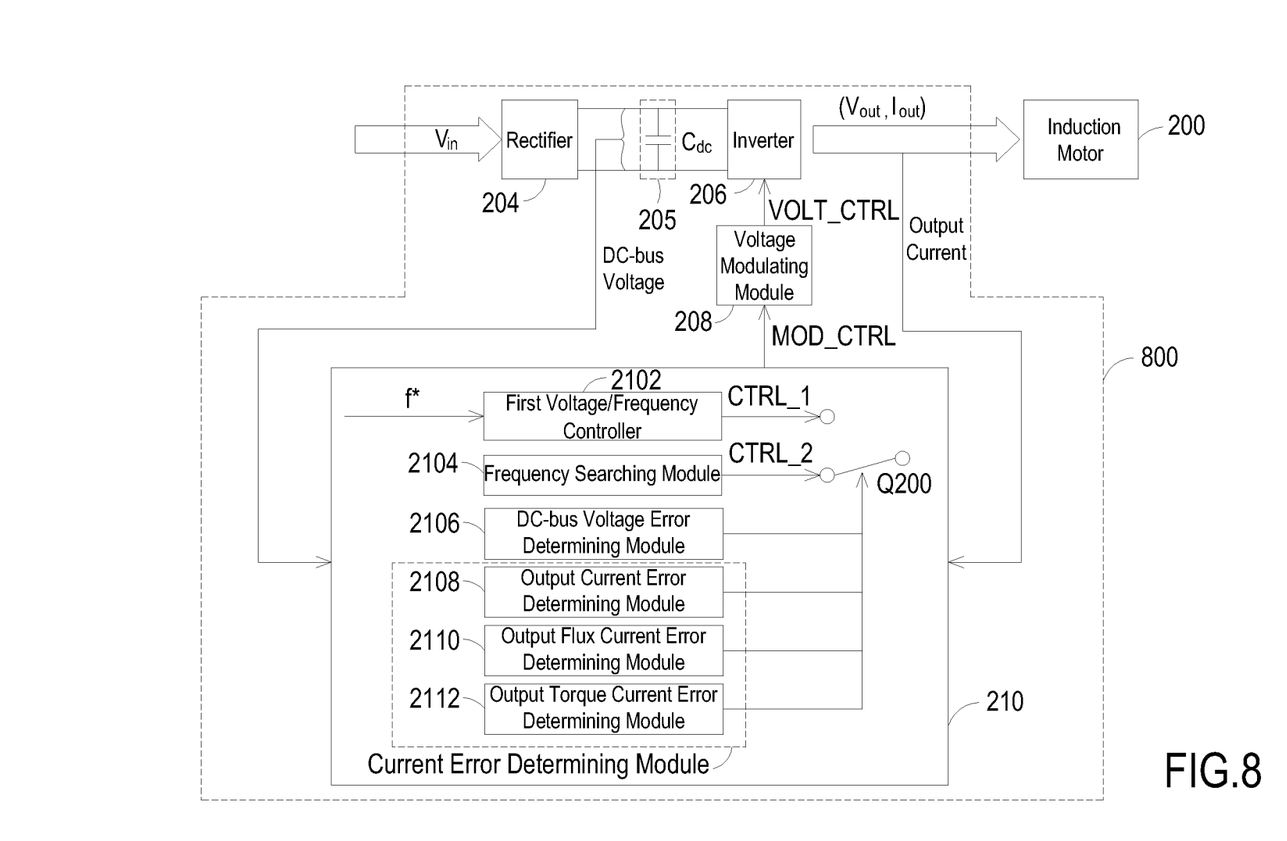
FIG. 8 is a block diagram of the variable frequency drive according to an exemplary embodiment of the invention.

Referring to FIG. 8, a block diagram of the variable frequency drive according to an exemplary embodiment of the invention is illustrated. As shown, the variable frequency drive 800 includes a rectifier 204, a capacitor $C_d$, (205), an inverter 206, a voltage modulating module 208 and a rotation speed searching apparatus 210. The rotation speed searching apparatus 210 selectively outputs the control signal CTRL_1 or the control signal CTRL_2 to the voltage modulating module 208 as a modulation control signal MOD_CTRL for controlling the operation of the voltage modulating module 208. The voltage modulating module 208 is configured to generate a voltage modulating signal VOLT_CTRL for controlling the operation of the inverter 206 according to the modulation control signal MOD_CTRL. The structure and the operation of the individual elements in the variable frequency drive 800 has been described in detail, and thus it is not intended to give details in connection with the variable frequency drive 800 herein.

In conclusion, the rotation speed searching apparatus for an induction motor according to the invention has the following advantages. First of all, the inventive rotation speed searching apparatus for an induction motor can avoid the drawback that the DC braking method is not able to fix the induction motor easily and can prevent the drawback that the DC braking method is prone to cause the induction motor to be overheated. Second, the inventive rotation speed searching apparatus for an induction motor does not need additional mechanical facilities, and thereby the cost is reduced. Most importantly, the inventive rotation speed searching apparatus for an induction motor employs a DC-bus voltage error determining module to increase the success rate of searching the rotation speed of the induction motor.

While the invention has been described in terms of what are presently considered to be the most practical and preferred embodiments, it is to be understood that the invention needs not be restricted to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the invention which is defined by the appended claims.

What is claimed is:

1. A rotation speed searching apparatus for an induction motor, comprising:
   a first voltage/frequency controller for receiving a frequency command signal and converting the frequency command signal into a first control signal;
   a frequency searching module for generating a frequency scanning signal to scan a rotor frequency of the induction motor and processing the frequency scanning signal to generate a second control signal;
   a switch having one terminal connected to a voltage modulating module and the other terminal operatively connected to the first voltage/frequency controller or the frequency searching module for passing the first control signal or the second control signal to the voltage modulating module according to its operation;
   a DC-bus voltage error determining module connected to a control terminal of the switch for comparing a detected DC-bus voltage with a set DC-bus voltage; and
   a current error determining module connected to the control terminal of the switch for comparing a feedback current with a set current,
   wherein when the DC-bus voltage error determining module determines that the detected DC-bus voltage is larger than or equal to the set DC-bus voltage or when the current error determining module determines that the feedback current is smaller than or equal to the set current, the switch is switched to pass the first control signal to the voltage modulating module, such that the voltage modulating module controls an inverter to drive the induction motor according to the first control signal, and wherein when the DC-bus voltage error determining module determines that the detected DC-bus voltage is smaller than the set DC-bus voltage and when the current error determining module determines that the feedback current is larger than the set current, the switch is switched to pass the second control signal to the voltage modulating module, such that the voltage modulating module controls the inverter to drive the induction motor according to the second control signal, and then the DC-bus voltage error determining module compares the detected DC-bus voltage with the set DC-bus voltage and the current error determining module compares the feedback current with the set current iteratively.

2. The rotation speed searching apparatus for an induction motor according to claim 1, wherein the DC-bus voltage error determining module includes:
   a DC-bus voltage feedback module for detecting a DC-bus voltage of the inverter to generate the detected DC-bus voltage;
   a first operator connected to the DC-bus voltage feedback module for generating a DC-bus voltage error signal in response to performing calculation with the detected DC-bus voltage and the set DC-bus voltage;
   a DC-bus voltage error determiner connected between the first operator and the control terminal of the switch for controlling the operation of the switch according to the DC-bus voltage error signal; and
   a DC-bus voltage error compensation calculating module connected to the first operator for calculating and outputting a DC-bus voltage error compensating signal for compensating an error of the detected DC-bus voltage according to the DC-bus voltage error signal.

3. The rotation speed searching apparatus for an induction motor according to claim 2, wherein the current error determining module includes an output current error determining module, an output torque current error determining module or an output flux current error determining module.

4. The rotation speed searching apparatus for an induction motor according to claim 3, wherein the output current error determining module includes:
   a first output current feedback module for generating a first detected output current in response to detecting an output current of the inverter;
   a second operator having one end connected to the first output current feedback module for generating an output current error signal in response to performing calculation with the first detected output current and a set output current;
   an output current error determiner connected between the second operator and the control terminal of the switch for controlling the operation of the switch according to the output current error signal; and
   an output current error compensation calculating module connected to the second operator for calculating and outputting an output current error compensating signal for compensating an error of the first detected output current according to the output current error signal.

5. The rotation speed searching apparatus for an induction motor according to claim 3, wherein the output flux current error determining module includes:
   a second output current feedback module for generating a second detected output current in response to detecting an output current of the inverter;
   a flux current calculating module for generating an output flux current in response to performing calculation with the second detected output current;
   a third operator having one end connected to the flux current calculating module for generating a flux current error signal in response to performing calculation with the output flux current and a set flux current;
   a flux current error determiner connected between the third operator and the control terminal of the switch for controlling the operation of the switch according to the flux current error signal; and
   a flux current error compensation calculating module connected to the third operator for calculating and outputting a flux current error compensating signal for compensating an error of the output flux current according to the flux current error signal.

6. The rotation speed searching apparatus for an induction motor according to claim 3, wherein the output torque current error determining module includes:
   a third output current feedback module for generating a third detected output current in response to detecting an output current of the inverter;
   a torque current calculating module for generating an output torque current in response to performing calculation with the third detected output current;
   a fourth operator having one end connected to the torque current calculating module for generating a torque current error signal in response to performing calculation with the output torque current and a set torque current;
   a torque current error determiner connected between the fourth operator and the control terminal of the switch for controlling the operation of the switch according to the torque current error signal; and
   a torque current error compensation calculating module connected to the fourth operator for calculating and outputting a torque current error compensating signal for compensating an error of the output torque current according to the torque current error signal.

7. The rotation speed searching apparatus for an induction motor according to claim 3, wherein the frequency searching module includes:
- a frequency scanning module for generating the frequency scanning signal to scan the rotor frequency of the the induction motor;
- a second voltage/frequency controller connected to the frequency scanning module for converting the frequency scanning signal into a first internal control signal;
- a proportion calculating unit connected to the second voltage/frequency controller for generating a second internal control signal in response to performing proportional calculation to the first internal control signal; and
- an adder connected among the proportion calculating unit, the DC-bus voltage error compensating module and at least one of the output current error compensation calculating module, the flux current error compensation calculating module and the torque current error compensation calculating module, for generating the second control signal in response to adding up the second internal control signal, the DC-bus voltage error compensating signal and at least one of the output current error compensating signal, the flux current error compensating signal and the torque current error compensating signal.

8. A variable frequency drive for driving an induction motor, comprising:
- a rectifier for converting an input AC power source into a DC power source;
- a capacitor for filtering, storing energy and holding DC voltage for the DC power source;
- an inverter having a plurality of switching units for converting the DC power source into an output AC power source;
- a voltage modulating module for generating a voltage modulating signal according to a modulation control signal to control operation of the switching units; and
- a rotation speed searching apparatus for an induction motor, comprising:
  - a first voltage/frequency controller for receiving a frequency command signal and converting the frequency command signal into a first control signal;
  - a frequency searching module for generating a frequency scanning signal to scan a rotor frequency of the induction motor and processing the frequency scanning signal to generate a second control signal;
  - a switch having one terminal connected to a voltage modulating module and the other terminal operatively connected to the first voltage/frequency controller or the frequency searching module for passing the first control signal or the second control signal as the modulation control signal to the voltage modulating module according to its operation;
  - a DC-bus voltage error determining module connected to a control terminal of the switch for comparing a detected DC-bus voltage with a set DC-bus voltage; and
  - a current error determining module connected to the control terminal of the switch for comparing a feedback current with a set current;
  - wherein the switching units in the inverter are configured to drive the induction motor according to the voltage modulating signal,
  - wherein when the DC-bus voltage error determining module determines that the detected DC-bus voltage is larger than or equal to the set DC-bus voltage or when the current error determining module determines that the feedback current is smaller than or equal to the set current, the switch is switched to pass the first control signal to the voltage modulating module, such that the voltage modulating module controls an inverter to drive the induction motor according to the first control signal, and wherein when the DC-bus voltage error determining module determines that the detected DC-bus voltage is smaller than the set DC-bus voltage and when the current error determining module determines that the feedback current is larger than the set current, the switch is switched to pass the second control signal to the voltage modulating module, such that the voltage modulating module controls the inverter to drive the induction motor according to the second control signal, and then the DC-bus voltage error determining module compares the detected DC-bus voltage with the set DC-bus voltage and the current error determining module compares the feedback current with the set current iteratively.

9. The variable frequency drive for driving an induction motor according to claim 8, wherein the DC-bus voltage error determining module includes:
- a DC-bus voltage feedback module for detecting a DC-bus voltage of the inverter to generate the detected DC-bus voltage;
- a first operator connected to the DC-bus voltage feedback module for generating a DC-bus voltage error signal in response to performing calculation with the detected DC-bus voltage and the set DC-bus voltage;
- a DC-bus voltage error determiner connected between the first operator and the control terminal of the switch for controlling the operation of the switch according to the DC-bus voltage error signal; and
- a DC-bus voltage error compensation calculating module connected to the first operator for calculating and outputting a DC-bus voltage error compensating signal for compensating an error of the detected DC-bus voltage according to the DC-bus voltage error signal.

10. The variable frequency drive for driving an induction motor according to claim 9, wherein the current error determining module includes an output current error determining module, an output torque current error determining module or an output flux current error determining module.

11. The variable frequency drive for driving an induction motor according to claim 10, wherein the output current error determining module includes:
- a first output current feedback module for generating a first detected output current in response to detecting an output current of the inverter;
- a second operator having one end connected to the first output current feedback module for generating an output current error signal in response to performing calculation with the first detected output current and a set output current;
- an output current error determiner connected between the second operator and the control terminal of the switch for controlling the operation of the switch according to the output current error signal; and
- an output current error compensation calculating module connected to the second operator for calculating and outputting an output current error compensating signal for compensating an error of the first detected output current according to the output current error signal.

12. The variable frequency drive for driving an induction motor according to claim 10, wherein the output flux current error determining module includes:

a second output current feedback module for generating a second detected output current in response to detecting an output current of the inverter;

a flux current calculating module for generating an output flux current in response to performing calculation with the second detected output current;

a third operator having one end connected to the flux current calculating module for generating a flux current error signal in response to performing calculation with the output flux current and a set flux current;

a flux current error determiner connected between the third operator and the control terminal of the switch for controlling the operation of the switch according to the flux current error signal; and a flux current error compensation calculating module connected to the third operator for calculating and outputting a flux current error compensating signal for compensating an error of the output flux current according to the flux current error signal.

13. The variable frequency drive for driving an induction motor according to claim 10, wherein the output torque current error determining module includes:

a third output current feedback module for generating a third detected output current in response to detecting an output current of the inverter;

a torque current calculating module for generating an output torque current in response to performing calculation with the third detected output current;

a fourth operator having one end connected to torque current calculating module for generating a torque current error signal in response to performing calculation with the output torque current and a set torque current;

a torque current error determiner connected between the fourth operator and the control terminal of the switch for controlling the operation of the switch according to the torque current error signal; and a torque current error compensation calculating module connected to the fourth operator for calculating and outputting a torque current error compensating signal for compensating an error of the output torque current according to the torque current error signal.

14. The variable frequency drive for driving an induction motor according to claim 10, wherein the frequency searching module includes:

a frequency scanning module for generating the frequency scanning signal to scan the rotor frequency of the induction motor;

a second voltage/frequency controller connected to the frequency scanning module for converting the frequency scanning signal into a first internal control signal;

a proportion calculating unit connected to the second voltage/frequency controller for generating a second internal control signal in response to performing proportional calculation to the first internal control signal; and an adder connected among the proportion calculating unit, the DC-bus voltage error compensating module and at least one of the output current error compensation calculating module, the flux current error compensation calculating module and the torque current error compensation calculating module, for generating the second control signal in response to adding up the second internal control signal, the DC-bus voltage error compensating signal and at least one of the output current error compensating signal, the flux current error compensating signal and the torque current error compensating signal.

* * * * *